Dec. 27, 1960  F. W. KELLEY, JR  2,966,625
MULTIPLE-FEEDBACK-PATH REGULATING SYSTEMS FOR GENERATORS
Filed Oct. 31, 1956  2 Sheets-Sheet 1

Inventor:
Fred W. Kelley, Jr.
by James E. Moore
His Attorney

Dec. 27, 1960  F. W. KELLEY, JR  2,966,625
MULTIPLE-FEEDBACK-PATH REGULATING SYSTEMS FOR GENERATORS
Filed Oct. 31, 1956  2 Sheets-Sheet 2

Inventor:
Fred W. Kelley, Jr.
by James E. W. Rose
His Attorney

United States Patent Office 2,966,625
Patented Dec. 27, 1960

2,966,625

MULTIPLE-FEEDBACK-PATH REGULATING SYSTEMS FOR GENERATORS

Fred W. Kelley, Jr., Melrose, Mass., assignor to General Electric Company, a corporation of New York Filed Oct. 31, 1956, Ser. No. 619,464

12 Claims. (Cl. 322—24)

The present invention relates to improvements in regulating systems and, more particularly, to systems for producing controlled outputs wherein superior stability and response characteristics are occasioned by uniquely related feedback arrangements.

In the usual form of controlled output system where a fixed or variable reference signal controls the values of system output, it is well known to employ a type of feedback which seeks to achieve accuracy and stability under both static and dynamic operating conditions. For example, in an arrangement wherein the voltage output of an A.-C. electrical generator is regulated by a small control signal exciting the power amplifiers which deliver D.-C. power to the generator exciting field, it will be found that the generator output responses to the control signal will rarely be accurate and stable, either statically or dynamically. A considerable improvement in these respects is effected, however, when measurement is made of the generator outputs and these measurements are fed back for comparison with the control signals (reference), the difference signals being applied as controlling input to the power amplifiers. It will be recognized that numerous other systems possess similar operating characteristics. Feedback of this nature, that is, taken from the controlled device and applied to influence the first control stage input, must be of relatively high gain values if stability is to be bettered substantially. And, it may be shown that high-gain feedback occasions the requirement that the reference control signal source be of relatively high power output capacity, which may constitute a material disadvantage in certain applications. Particularly in those systems wherein a number of control stages are employed, this type of feedback also reflects the disturbances in all of the system stages, such that accuracies and responses are affected adversely. Further, the time constants of system components cannot be advantageously optimized in arrangements utilizing only such feedback.

Accordingly, it is one of the objects of the present invention to provide regulating systems wherein accuracy and response are improved by critically related multiple feedback signals.

A further object is to reduce disturbances and minimize control power requirements in regulating systems.

By way of a summary account of this invention in one of its aspects, I provide a controlled A.-C. generator having an excitation field energized by the D.-C. output of a full-wave single-phase amplistat. The control windings for this amplistat are excited in a regenerative sense by the amplistat output and also in a degenerative sense jointly by a source of reference control signals and D.-C. signals related to the generator A.-C. output. A.-C. excitation for the amplistat load or gate winding circuitry is taken from the generator output, such that the amplistat output characteristics further reflect the application of regenerative feedback from the controlled generator to the control amplistat. By exercise of conventional design techniques, the influences of the signals impressed upon the amplistat control windings are caused to be more pronounced than the variations in regenerative feedback from the generator output affecting the amplistat excitation. With this arrangement, it is found that the gain in the degenerative feedback path, from the generator output to the principal control winding of the amplistat, may be made relatively small, and the source of reference control signals may be of relatively small power capacity. Dynamic and static operating characteristics are excellent, also.

Although the features of this invention which are believed to be novel are set forth in the appended claims, further details of the invention and the objects and advantages thereof may be readily comprehended through reference to the following description taken in connection with the accompanying drawing, wherein:

Figure 1:
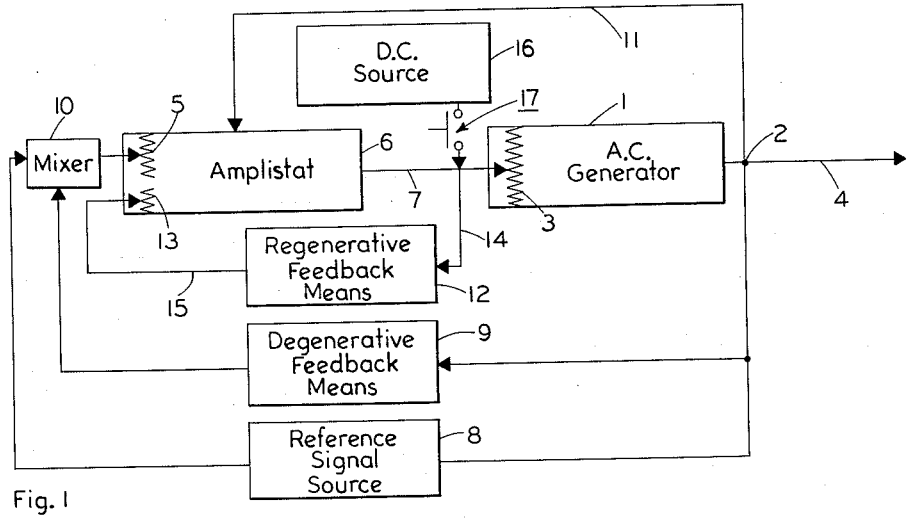
Figure 1 is a block diagram of a regulating system embodying certain of the present teachings.

The arrangement presented in Figure 1 includes a known type of A.-C. generator 1, which is the controlled device in the system, this generator delivering a voltage output at position 2 along the circuitry represented in a single-line convention. Control of the generator output is here achieved by adjustment of the D.-C. signals applied to the generator excitation field windings 3. As is well understood, the voltage levels at position 2, where the output supplies a suitable load coupled with leads designated by numeral 4, may vary by undesired amounts if the signals impressed upon field winding 3 are essentially fixed and the load varies. Provision should thus be made for the application of appropriately compensated control signals to field windings 3. This compensation may be conveniently introduced to the main input control winding 5 of a control amplistat 6 the output of which is applied to the generator field windings 3 over leads identified by reference character 7. Without such compensation, the amplistat control winding 5 would be excited directly by adjustable D.-C. reference control signals from a reference signal source 8, and the excitation of generator field windings 3 and, in turn, the output of generator 1, would be adjusted accordingly. In compensation of the effects of the aforesaid generator output variations, however, a degenerative D.-C. feedback signal is derived from the generator A.-C. output by means 9, and the difference signals between the reference and feedback values are applied, instead, to the amplistat control winding 5 by a mixer 10. Now, as the generator output changes, correction is made via suitable alterations of the excitation delivered to the generator field windings 3. This expedient has been utilized heretofore, although the feedback circuit has been required to be of a high-gain characteristic and it has further been required that the reference source be of relatively high power capacity. The latter disadvantage becomes particularly critical where the reference source is to be of a high-precision type.

Amplistat 6 in this system may be of a conventional construction including, in its single-phase full-wave version, a pair of gate or load windings cooperating with saturable magnetic material and each coupled with the output circuitry through a different dry current rectifier. The main control winding 5 serves to adjust the saturation characteristics of the magnetic material such that the output circuitry, here the generator field windings 3, receives controlled excitation from the A.-C. supply which energizes the amplistat gate windings. In Figure 1, this A.-C. amplistat supply is shown taken from the generator output position 2 by way of leads identified by numeral 11. Such A.-C. excitation of the amplistat is highly advantageous, because other A.-C. sources need not be available, although there is the accompanying complication that amplistat output will change with the A.-C. excitation variations. This intercoupling between the controlled and control elements thus constitutes a form of regenerative feedback, inasmuch as lowered generator output will occasion lowered amplistat output and decreased generator field excitation tending to drive the generator output even lower, and conversely for the case of increased generator output. Effects of regenerative feedback of this nature are not adequately overcome by the main degenerative feedback earlier described, and thus system instabilities arise. However, a further critical feedback loop embracing only portions of the control system and not involving output of the controlled element (generator 1) aids in achieving the needed stability. Critically regenerative feedback means 12 contributes to this result, and is shown to couple the amplistat output from position 7 to an auxiliary or feedback amplistat control winding 13 over leads identified by reference characters 14 and 15. A D.-C. source 16 in Figure 1 is depicted incidentally, together with a switch 17, for purposes of "flashing" the generator field 3, thereby building up needed output as the system is brought into operation.

Upon occurrence of a drop in generator output voltage, as with a load variation, the difference signal applied to the main amplistat control winding 5 as the result of degenerative feedback through feedback means 9 will seek to increase the output of amplistat 6 to the generator excitation field 3. This net effect of increased amplistat output as the result of the main amplistat control winding signal will in fact occur, but, because the lowered generator output has simultaneously lowered the A.-C. supply to the amplistat over the regenerative feedback line 11, the amplistat output will not, in absence of feedback means 12, provide rapid and sufficient compensating excitation to the generator field windings 3. It is in this latter connection that the regenerative feedback means 12 becomes important. As the output of amplistat 6 increases in the aforementioned manner, even though not sufficiently to accomplish the needed compensation unaided, the regenerative feedback to the amplistat auxiliary control winding 13 also changes and functions in a sense to increase the amplistat output to the generator field windings 3 by the amount required to provide faithful responses.

In like manner, as the generator output increases beyond the value called for by the reference source 8, the degenerative feedback means 9 influences the input to the main amplistat control winding 5 such that the amplistat output drops. However, the drop tends to be insufficient because of the increased amplistat supply voltage regeneratively fed along line 11. The tendency for the increased supply to prevent adequate decrease in amplistat output is overcome, however, by the regenerative feedback means 12 which responds to the decreased amplistat output by applying signals to the amplistat feedback winding 13 in a sense tending to decrease the amplistat output.

For the described compensated operation to take place, it is necessary that the amplistat respond predominantly to its control winding signals rather than predominantly to the variations in its A.-C. supply signals over line 11. This is readily insured by straightforward design of the control winding circuitry such that the control winding turns are of a satisfactory number, and the control excitation signals of sufficient magnitude, etc. Regenerative feedback to the feedback control windings may be adjusted in a similar manner to provide the desired degree and ranges of compensated responses.

Feedback regions in the systems of Figure 1 are critically related. Expressed in other terms, the generator 1 is a controlled device having a controlled output appearing at 2. Control is achieved by control equipment 6 having a control output at 7, a first control input at 5 and 13, and a second control input at line 11. The controlled device control input is then at 3, and may coincide with the control output 7. Regenerative feedback is applied from a control output to the first control input, regenerative feedback is applied from the controlled output to the second control input, and degenerative feedback is applied from the controlled device output to the first control input. Control equipment output must respond predominantly to the degenerative feedback signals.

Figure 2:
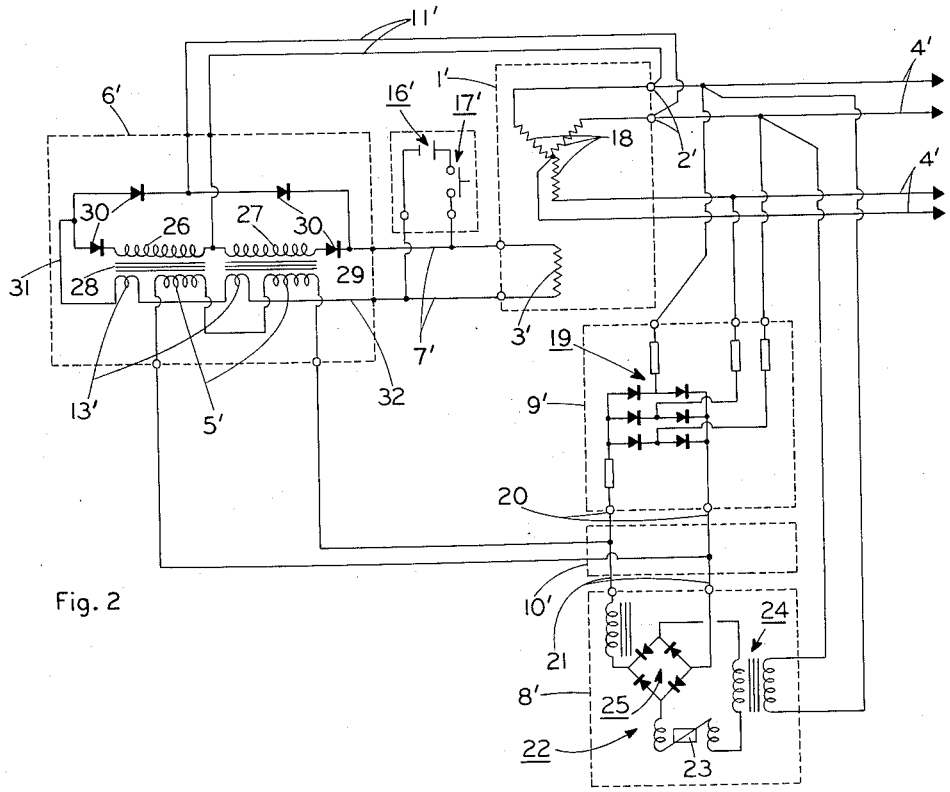
Figure 2 illustrates schematically a regulated A.-C. generating system having single-phase control circuitry with which this invention is practiced.

Referring to Figure 2, it will be perceived that the system there portrayed corresponds to that of Figure 1, with the control equipment being of single-phase circuitry. For convenience, the components of the Figure 2 system corresponding to those in Figure 1 are identified by the same reference characters, with single-prime accents added. The A.-C. generator 1' is there shown to include three-phase output windings 18, and the degenerative feedback means 9' includes a three-phase bridge rectifier unit 19 energized by the voltages appearing across the generator output leads 4'. Accordingly, the bridge rectifier D.-C. output signals appearing across the output leads 20 are representative of the average of the generator line-to-line output voltages. Reference signal source 8' also provides D.-C. output signals across its output leads 21, for purposes of comparison with the output of feedback means 9'. In deriving these reference signals, the well-known magnetic current reference 22 is employed, this device comprises a saturable-core reactor so arranged that its core will be forced well into saturation by means of a permanent magnet 23. Excitation for the magnetic current reference is drawn from the generator output leads 4' through a transformer 24 and, in a known manner, the output of its associated bridge rectifier unit 25 is governed by the strength of the permanent magnet 23. Amplistat main control windings 5' are energized by currents representing the differences between the reference source 8' and degenerative feedback means 9', these difference signals appearing through interconnections at 10' which achieve the "mixing" function. Amplistat 6' further comprises the two main gate windings 26 and 27, saturable main cores 28 and 29, dry rectifiers 30, and auxiliary or feedback control windings 13'. Regenerative feedback corresponding to that supplied by means 12 in Figure 1 is delivered through windings 13' by the connections 31 and 32 which couple these windings with the amplistat output to its load, generator winding 3'. Regenerative feedback from generator output terminals 2' is accomplished by the coupling leads 11' which provide the A.-C. supply or excitation to amplistat 6'. Operation corresponds to that outlined hereinbefore with reference to the system of Figure 1.

Figure 3:
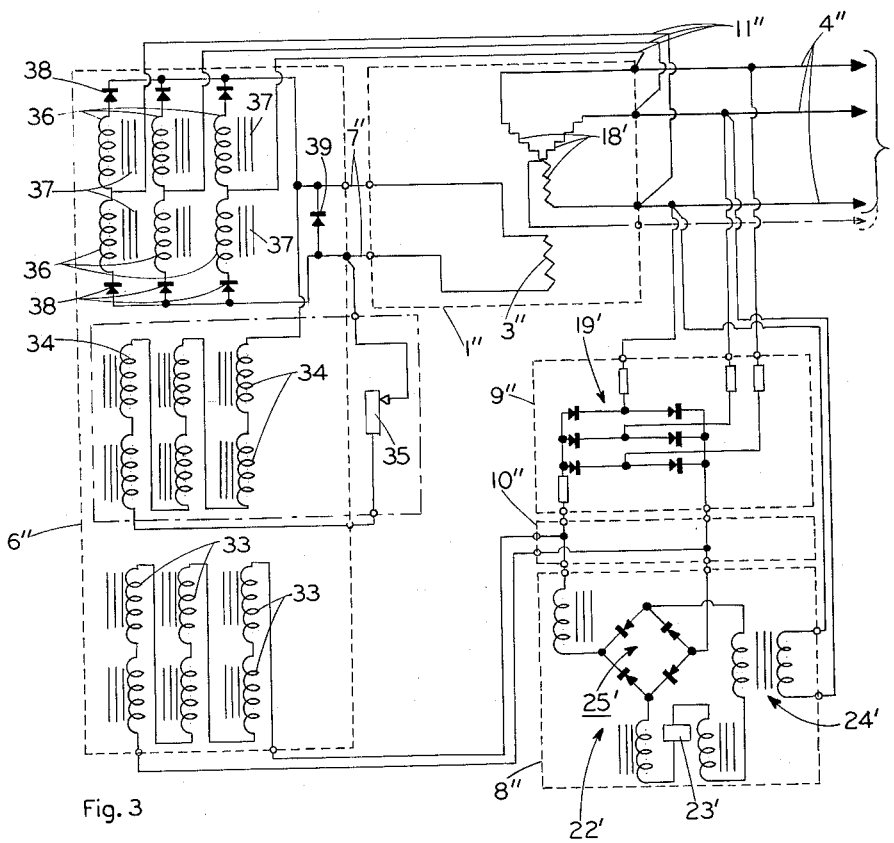
Figure 3 depicts schematically an alternative regulated A.-C. generating system having three-phase control circuitry.

Figure 3 depicts a like system wherein the control amplistat circuitry is of three-phase form and the regenerative feed-back between the amplistat output and input depends upon amplistat output voltage rather than current. In focussing upon this distinction without complicating the disclosures, all circuit elements corresponding to those in Figure 2 are identified by the same reference characters, with a distinguishing prime accent added in each instance. Amplistat 6" is seen to include six series-coupled main control windings 33 which are energized by the output of the mixer, 10", and also includes six series-coupled feedback control windings 34 which are energized by the output of amplistat 6" through a gain-control resistance 35. Six main amplistat gate windings 36 are associated with saturable cores 37 and dry current rectifiers 38 in the usual manner, with three-phase A.-C. supply being furnished, together with its regenerative feedback component, over leads 11" connected to the line-to-line output terminals of A.-C. generator 1". A commutating rectifier 39, of customary application, is illustrated in position across the amplistat output leads 7". Operational characteristics here also are essentially those described in connection with the system of Figure 1.

Figure 4:
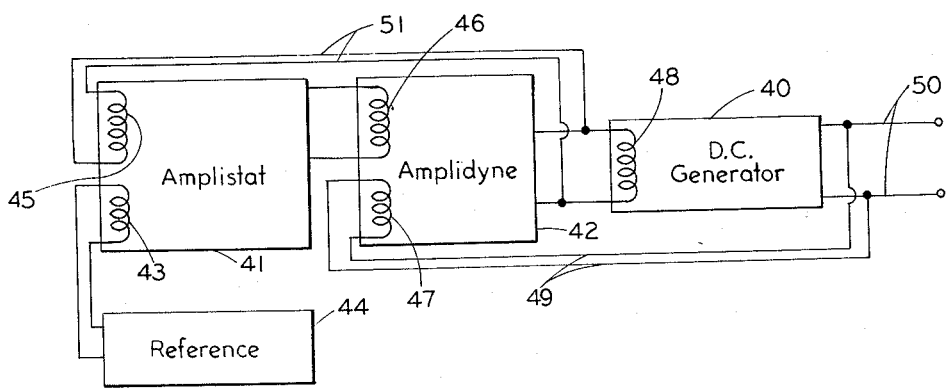
Figure 4 provides a block-diagrammed representation of an improved D.-C. generator system regulated through an amplidyne.

Application of these teachings to other systems is further disclosed in the block-diagrammed showing of Figure 4 wherein a D.-C. generator 40 has its output regulated by operation of a control amplistat 41 and an amplidyne unit 42. Amplistat 41 has a control input stage with two control elements: a main control winding 43, energized by a source of reference D.-C. signals 44, and a regenerative feedback control winding 45. The first control output stage is that of control amplistat 41 and is delivered to one input control winding, 46, of the control amplidyne 42. A feedback input control winding 47 is also associated with amplidyne 42 for purposes detailed later herein. As is presently well understood, the amplidyne is in the nature of a special D.-C. generator, or electro-mechanical power amplifier, in which only small amounts of control power supplied to its control windings can occasion large power output amplifications. Amplidyne 42 thus serves as a further control amplifier in the system of Figure 4, and its control ouput is applied to the input control winding 48 of the D.-C. generator 40, which is the controlled element of the system.

Only two feedback paths are required in this regulating system, and it is a decided advantage that neither encompasses the system from end to end. One of these paths is provided by leads 49 which feed signals from the generator output leads 50 back to the input of amplidyne 42 through the feedback control winding 47. This feedback is made degenerative, or negative. The second path is provided by leads 51 which couple output of amplidyne 42 back to the input feedback control winding 45. This second feedback path is made regenerative, or positive. Also, the effects of the degenerative feedback upon the control input to generator 40 are made more pronounced than the effects of the regenerative feedback upon this same input.

If it now be assumed that for a given adjustment of the output of reference source 44 the D.-C. generator 40 delivers a certain output to its load, and that this output then varies by decreasing from the desired value, the degenerative feedback over leads 49 tends to increase the control input to generator 40 and, thereby, to increase the output again. Without further control, stability is absent from the system because the generator output is not directly compared with a reference. However, any change in amplidyne output is accompanied by critically regenerative feedback of this response over leads 51 to the feedback input winding 45 of control amplistat 41. This regenerative feedback functions critically to decrease the amplistat and amplidyne outputs by amounts required to restore the generator output to the level sought to be governed by the reference source. Such action does not occur, however, unless the degenerative feedback has a net effect upon the amplidyne output which is greater than that of the critically regenerative feedback. Gain adjustments of the regenerative feedback loop aid in controlling the system responses also. For an increase in generator output beyond the desired value the operation is of like character but opposite sense. Remarkably, the regulating system requires no comparison of generator output with the control reference signal, yet accurate responses are secured. A cardinal advantage of this form of system is found in the fact that there is no encompassing feedback loop, from the controlled output stage back through the first control input stage, whereby all of the numerous system disturbances could be aggravated. Here also, the reference source may be of relatively small power output capacity, and the regenerative feedback loop will be recognized as supplying part of total amplistat control power.

While particular embodiments of this invention have been illustrated and described, it will occur to those skilled in the art that various changes and modifications can be made without departure from these teachings, and therefore, it is aimed in the appended claims to cover all such changes and modifications as fall within the true spirit and scope of the invention.

What I claim as new and desire to secure by Letters Patent of the United States is:

1. A regulating system comprising a control signal source; control amplifier means having a first input, an output, and a second input, the output signals of said output being controlled by signals applied to said first and second inputs; a controlled device controlled by said output signals and having means for delivering regulated output signals to a load; means coupling said first input with said source for excitation thereby; means applying signals responsive to output signals from said controlled device to said second input; and critically regenerative applying signals responsive to output signals from said amplifier means output to said first input.

2. A regulating system comprising control amplifier means having a first input, an output, and a second input, the output signals of said output being controlled by signals applied to said first and second inputs, a controlled device under control of said amplifier means output signals having an output for delivering regulated output signals to a load, means applying signals responsive to output signals from said controlled device to said second input, critically regenerative means applying signals responsive to output signals from said amplifier means to said first input, means producing control signals for control of said controlled device, and means applying said control signals to said first input.

3. A regulating system comprising a control signal source; control amplifier means having a first input, an output, and a second input, the output signals of said output being controlled by signals applied to said first and second inputs; a controlled device controlled by said output signals and having an output for delivering regulated output signals to a load; means coupling said first input with said source for excitation thereby; means degeneratively applying signals responsive to output signals from said controlled device output to said second input; and critically regenerative means applying signals responsive to output signals from said amplifier means to said first input; said amplifier means producing output signals at said amplifier means output predominantly responsive to signals applied to said second input.

4. A regulating system comprising control amplifier means having a first input, an output, and a second input, the output signals of said output being controlled by signals applied to said first and second inputs, a controlled device controlled by said output signals and having an output for delivering regulated output to a load, means regeneratively applying signals responsive to output signals from said controlled device output to said second input, means regeneratively applying signals responsive to output signals from said amplifier means output to said first input, a reference signal source, means producing control signals responsive to differences between reference signals from said source and signals responsive to output signals from said controlled device output, and means applying said control signals to said first input, said amplifier means producing output signals at said amplifier means output predominantly responsive to signals applied to said first input.

5. A regulating system comprising control amplifier means having successively intercoupled inputs and outputs, a controlled device having an output for delivering regulated output signals to a load and having an input excited by a final output of said amplifier means, means producing control signals for regulation of said controlled device, means applying said control signals to an input of said amplifier means, first means regeneratively coupling signals responsive to output signals from an output of said amplifier means with an input of said amplifier means, and second means degeneratively applying signals responsive to output signals from said controlled device to an input of said amplifier means intermediate said input and output coupled by said first means, said amplifier means producing output signals in said final output thereof which are predominantly responsive to said signals degeneratively applied to said intermediate input.

6. A regulating system comprising control amplifier means having a plurality of inputs and an output, a controlled device having an output for delivering regulated output signals to a load and having an input excited by a final output of said amplifier means, means producing reference signals for regulation of said controlled device, means producing degenerative feedback signals responsive to output signals from said controlled device, means comparing said reference and degenerative feedback signals and energizing an input of said amplifier means in accordance with the difference signals therebetween, first means regeneratively coupling signals responsive to output signals from an output of said amplifier means with an input of said amplifier means, and second means regeneratively applying signals responsive to output signals from said controlled device to an input of said amplifier means intermediate said input and output coupled by said first means, said amplifier means producing output signals in said final output thereof which are predominantly responsive to energization by said comparing means.

7. A regulating system comprising an A.-C. generator having a control field winding; a control amplistat having gate windings, rectifier means associated with said gate windings, and control winding means; means coupling said generator control field winding as a load for said amplistat; means applying output of said generator as the A.-C. supply for said amplistate gate windings; a source of D.-C. reference signals; means producing D.-C. degenerative feedback signals responsive to output signals of said generator; means exciting said control winding means responsive to both said reference and feedback signals, and means responsive to the output signals of said amplistat regeneratively exciting said amplistat control winding means; said amplistat output signals responding predominantly to said excitation responsive to said reference and feedback signals.

8. A regulating system for an A.-C. generator having a control field winding, comprising a control amplistat having a main control winding and a feedback control winding, means for applying A.-C. output of said generator as the A.-C. supply for said amplistat, whereby the D.-C. output of said amplistat tends to respond to variations in said generator A.-C. output, means for applying said amplistate D.-C. output to said generator control field winding, means regeneratively applying said amplistat D.-C. output to said feedback control winding, a source of reference D.-C. signals, means for producing degenerative D.-C. feedback signals responsive to said generator A.-C. output, and means coupling said reference and degenerative feedback signals with said main control windings, said amplistat being arranged to produce said D.-C. output signals predominantly responsive to control by said main control winding.

9. A regulating system for an A.-C. generator having a control field winding, comprising control amplistat means having a main control winding means and feedback control winding means, means for applying D.-C. output of said amplistat to said generator field winding, means for applying A.-C. output of said generator as the A.-C. supply for said amplistat means, whereby said D.-C. output of said amplistat means tends to respond to variations in said generator output and said generator tends to operate regeneratively, means regeneratively applying signals responsive to said amplistat means D.-C. output to said feedback control winding means, a source of reference D.-C. signals, rectifier means for producing D.-C. feedback signals responsive to said generator A.-C. output, and means applying the difference signals between said reference and feedback signals to said main control winding means, said control amplistat means being arranged to produce said D.-C. output signals predominantly responsive to control by said main control winding means.

10. A regulating system comprising a control signal source; control amplifier means having a first input, a second input, and an output for delivering output signals, said output signals being controlled by signals applied to said first and second inputs; a controlled device controlled by said output signals and having means for delivering regulated output signals to a load; means coupling said first input with said source for excitation thereby; means applying critically regenerative signals responsive to output signals from said amplifier means to said first input; and means applying degenerative signals responsive to output signals from said controlled device output to said second input.

11. A regulating system comprising a control signal source; control amplifier means having a first input, a second input, and an output for delivering output signals, said output signals being controlled by signals applied to said first and second inputs; a controlled device controlled by said output signals and having means for delivering regulated output signals to a load; means coupling said first input with said source for excitation thereby; a critically regenerative feedback loop applying signals responsive to output signals from said amplifier means to said first input; and a degenerative feedback loop applying signals responsive to output signals from said controlled device output to said second input.

12. A regulating system comprising a control signal source; control amplifier means having a first input, a second input, and an output for delivering output signals, said output signals being controlled by signals applied to said first and second inputs; a controlled device controlled by said output signals and having means for delivering regulated output signals to a load; means coupling said first input with said source for excitation thereby; a critical feedback loop applying regenerative signals responsive to output signals from said amplifier means to said first input; and a degenerative feedback loop applying signals responsive to output signals from said controlled device output to said second input.

References Cited in the file of this patent

UNITED STATES PATENTS

| | | |
|---|---|---|
| 2,725,517 | Rogers | Nov. 29, 1955 |
| 2,728,044 | Stearley | Dec. 20, 1955 |
| 2,768,344 | McKenna | Oct. 23, 1956 |
| 2,769,133 | Franklin | Oct. 30, 1956 |
| 2,791,740 | McKenna et al. | May 7, 1957 |
| 2,806,990 | Evans | Sept. 17, 1957 |